July 26, 1949.　　　K. G. MATTI ET AL　　　2,477,071

PARQUET FLOOR

Filed June 25, 1945

INVENTORS
KURT GUNTER MATTI
LARS VICTOR SIGVARD EHRNEBO
By Haseltine, Lake & Co.
ATTORNEYS Patented July 26, 1949

2,477,071

UNITED STATES PATENT OFFICE 2,477,071

PARQUET FLOOR

Kurt Günter Matti and Lars Victor Sigvard Ehrnebo, Eskilstuna, Sweden

Application June 25, 1945, Serial No. 601,510
In Sweden April 15, 1944

Section 1, Public Law 690, August 8, 1946
Patent expires April 15, 1964

1 Claim. (Cl. 20—75)

The present invention refers to parquet floors and relates to such flooring units provided with parquet bars, wherein the latter are adapted to form a coherent wearing layer, which is connected by gluing or otherwise with a carrying structure consisting of bar-shaped elements extending in the longitudinal direction of the flooring element.

The object of the invention is to provide reinforcement for the flooring unit which is designed to prevent warping and unevenness due to expansion and to provide a greater carrying power of the flooring units which are to be used as ordinary flooring boards or planks. In substance, this would be obtained by the bar-shaped elements being mutually braced by means of groove fillets displaceable in grooves extending in the transverse direction of the bar-shaped elements and arranged within the layer subjected to pressure at flexure.

Figure 1:
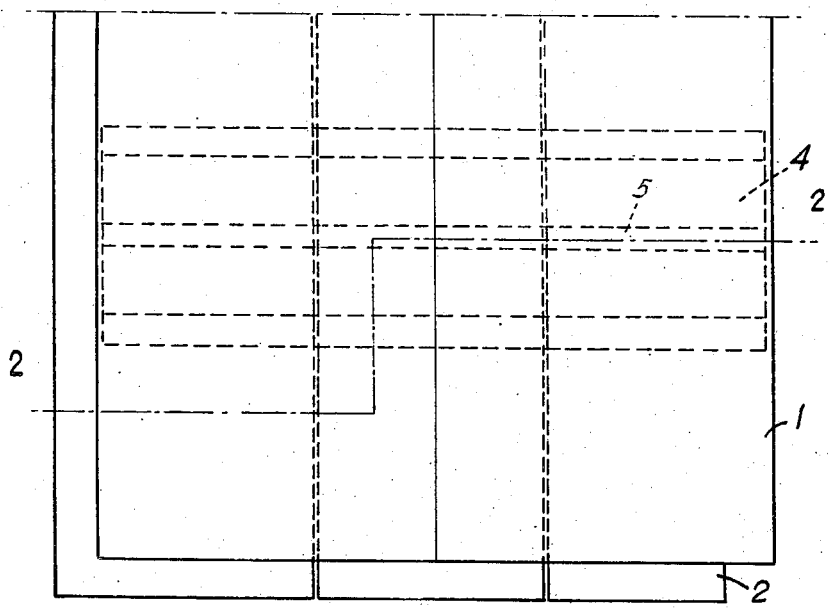
Figure 2:
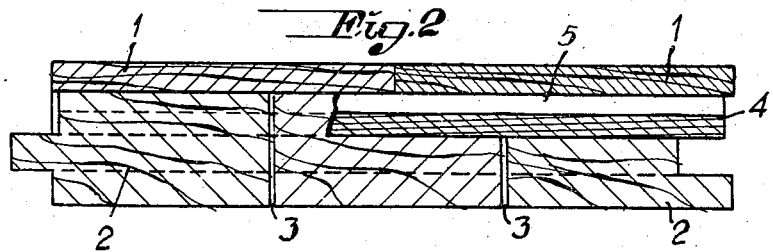
Figure 3:
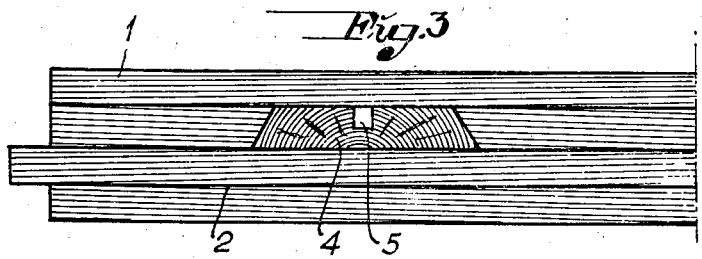

The accompanying drawing illustrates an example of embodiment according to the invention. Fig. 1 is a plan view of a portion of a flooring unit. Fig. 2 is a section on line 2—2 in Fig. 1. Fig. 3 shows the flooring unit in elevation.

Parquet bars 1 are adapted to form the wearing layer of the flooring unit, said wearing layer being preferably connected by gluing with bar-shaped or supporting lath extending in the longitudinal direction of the flooring unit, said supporting elements forming together the flooring unit of the carrying structure. Said supporting elements 2 are arranged, according to the example, at a mutual distance, so that slit-shaped openings 3 are produced between two adjacent supporting elements. These are consequently only connected with each other through the agency of the wearing layer or the parquet bars. For the guidance or mutual bracing of the supporting elements 2 and the flooring unit in its entirety there are provided groove fillets 4 in the transverse direction of the supporting elements 2 at a relative distance from the lower surface of the flooring unit. The groove fillets are arranged in a layer which is subjected to pressure at strains of flexure in the flooring unit. From a manufacturing point of view it is of advantage to arrange the groove fillets at the upper surface thereof so that the groove fillets will be located adjacent to the parquet bar layer. Hereby the layer of the flooring unit subjected to the maximum tensile strain could be maintained whole, whereby the flooring unit is given a considerably greater strength than if the bottom layer had been cut off by grooves in one or more places. On the other hand, the layer subjected to compressive strain is divided, according to the example, by means of the groove fillets. It should be obvious that the groove fillets may take up at least the major portion of said compressive strain, in spite of the fact that the groove fillets are not connected rigidly with the walls of the grooves. In placing the groove fillets in the bottom layer, the fillets can in no way aid toward obviating the drawback caused by severing the bottom fibres.

By locating the groove fillets in accordance with the invention, a considerably improved bracing of the flooring unit will also be obtained, depending on the fact that both of the bracing surfaces of the groove fillets are in their entirety in engagement with the flooring unit. By the use of groove fillets made with a dove-tailed cross section in a manner known per se, a guiding effect is obtained which is still further improved, said improved effect originating from the wedge-effect obtained through the oblique edges of the groove fillets.

To avoid a bursting effect, the groove fillets may be formed with a longitudinally extending weakened zone, for instance be provided with a channel 5.

We claim:

A parquet flooring unit comprising a tread layer consisting of juxtaposed parquet boards, a carrying surface for said tread layer affixed thereto consisting of spaced laths extending and having their grain directed in the same direction as said boards, and groove fillets arranged transversely of said laths and sunk in the upper portion thereof, whereby the upper portion of said laths is rigidly braced while the lower portion thereof is freely displaceable transversely of said boards.

KURT GÜNTER MATTI.
LARS VICTOR SIGVARD EHRNEBO.

REFERENCES CITED

The following references are of record in the file of this patent:

UNITED STATES PATENTS

| Number | Name | Date |
| --- | --- | --- |
| 1,801,093 | Larkins | Apr. 14, 1931 |
| 2,324,628 | Kahr | July 20, 1943 |

FOREIGN PATENTS

| Number | Country | Date |
| --- | --- | --- |
| 138,184 | Austria | July 10, 1934 |
| 368,188 | Great Britain | Mar. 3, 1932 |
| 473,990 | Germany | Mar. 23, 1929 |
| 519,198 | Great Britain | Mar. 19, 1940 |